US012157302B2

(12) United States Patent
Skoglund et al.

(10) Patent No.: US 12,157,302 B2
(45) Date of Patent: Dec. 3, 2024

(54) INK JET PRINTER OVERSPRAY TECHNIQUES

(71) Applicant: ASSA ABLOY AB, Stockholm (SE)

(72) Inventors: John P. Skoglund, Prior Lake, MN (US); Tanya Jegeris Snyder, Edina, MN (US); Dale James Ziebarth, Elk River, MN (US); Mark Mizen, Maple Grove, MN (US); Ruben Rosario, Burnsville, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/931,703

(22) Filed: Sep. 13, 2022

(65) Prior Publication Data

US 2023/0001688 A1 Jan. 5, 2023

Related U.S. Application Data

(63) Continuation of application No. 17/060,578, filed on Oct. 1, 2020.

(60) Provisional application No. 63/078,268, filed on Sep. 14, 2020.

(51) Int. Cl.
*B41J 2/045* (2006.01)

(52) U.S. Cl.
CPC ......... *B41J 2/04505* (2013.01); *B41J 2/0456* (2013.01); *B41J 2/04586* (2013.01)

(58) Field of Classification Search
CPC .. B41J 2/04505; B41J 2/0456; B41J 2/04586; B41J 2/04501; B41J 13/12; B41J 11/0065; B41J 2/01; B41J 29/12; B41J 11/06
See application file for complete search history.

(56) References Cited

U.S. PATENT DOCUMENTS

| | | | |
|---|---|---|---|
| 6,231,646 | B1 | 5/2001 | Schweizer et al. |
| 6,685,312 | B2 | 2/2004 | Klinefelter et al. |
| 2001/0042400 | A1 | 11/2001 | Boyle et al. |
| 2001/0055054 | A1 | 12/2001 | Kosaka et al. |
| 2005/0057590 | A1 | 3/2005 | Nunokawa et al. |
| 2005/0151775 | A1 | 7/2005 | Edwards et al. |

(Continued)

FOREIGN PATENT DOCUMENTS

| | | |
|---|---|---|
| CN | 101466548 | 6/2009 |
| CN | 103640337 | 3/2014 |

(Continued)

OTHER PUBLICATIONS

"U.S. Appl. No. 17/060,578, Response filed May 12, 2022 to Restriction Requirement mailed Mar. 17, 2022", 10 pgs.

(Continued)

*Primary Examiner* — Kristal Feggins
(74) *Attorney, Agent, or Firm* — Schwegman Lundberg & Woessner, P.A.

(57) ABSTRACT

Techniques for handling and reducing ink overspray of an ink jet printer are provided. In an example, an ink overspray collector for an ink jet printer can include a first opening defining a first print area of the ink jet printer, and a frame about the first opening. The frame is configured to receive overspray from operation of the ink jet printer and can be formed of a woven material. In some examples, a controller of the ink jet printer can reduce an amount of ink ejected near the edges of the print media to reduce overspray.

17 Claims, 7 Drawing Sheets

(56) References Cited

U.S. PATENT DOCUMENTS

| | | | | |
|---|---|---|---|---|
| 2007/0236535 | A1 | 10/2007 | Baker et al. | |
| 2012/0120134 | A1 | 5/2012 | Gunnell et al. | |
| 2015/0265072 | A1 * | 9/2015 | Ridless | B44D 3/185 40/773 |
| 2017/0320335 | A1 | 11/2017 | Wooldridge et al. | |
| 2020/0147630 | A1 | 5/2020 | Lipson | |
| 2020/0247147 | A1 | 8/2020 | Snyder et al. | |
| 2022/0080724 | A1 | 3/2022 | Skoglund et al. | |

FOREIGN PATENT DOCUMENTS

| | | | | |
|---|---|---|---|---|
| CN | 111516394 | | 8/2020 | |
| CN | 114179511 | A | 3/2022 | |
| EP | 1150245 | | 10/2001 | |
| EP | 1231067 | | 8/2002 | |
| EP | 3689623 | A1 * | 8/2020 | B41J 11/00 |

OTHER PUBLICATIONS

"U.S. Appl. No. 17/060,578, Restriction Requirement mailed Mar. 17, 2022", 6 pgs.

"U.S. Appl. No. 17/060,578, Restriction Requirement mailed Aug. 18, 2022", 6 pgs.

"European Application Serial No. 21181765.5, Extended European Search Report mailed Apr. 12, 2022", 12 pgs.

"European Application Serial No. 21181765.5, Partial European Search Report mailed Jan. 10, 2022", 14 pgs.

"U.S. Appl. No. 17/060,578, Response filed Sep. 13, 2022 to Restriction Requirement mailed Aug. 18, 2022", 6 pgs.

"European Application Serial No. 21181765.5, Response Filed Nov. 8, 2022 to Extended European Search Report mailed Apr. 12, 2022", 10 pgs.

"U.S. Appl. No. 17/060,578, Notice of Allowance mailed Jan. 4, 2023", 9 pgs.

"European Application Serial No. 22208853.6, Extended European Search Report mailed Jan. 20, 2023", 11 pgs.

"Chinese Application Serial No. 202110721809.3, Office Action mailed Dec. 27, 2022", w English Translation, 13 pgs.

"U.S. Appl. No. 17/060,578, Corrected Notice of Allowability mailed Feb. 13, 2023", 2 pgs.

"European Application Serial No. 21181765.5, Communication Pursuant to Article 94(3) EPC mailed Jul. 24, 2023", 10 pgs.

* cited by examiner

INK JET PRINTER OVERSPRAY TECHNIQUES

PRIORITY APPLICATIONS

This application is a continuation application of U.S. patent application Ser. No. 17/060,578, titled "Ink Jet Printer Overspray Techniques," filed Oct. 1, 2020, which claims priority to U.S. Provisional Application Ser. No. 63/078,268, filed Sep. 14, 2020, each of which is hereby incorporated herein by reference in its entirety.

FIELD OF THE DISCLOSURE

The present document relates to printing and more particularly, to techniques for reducing or handling ink overspray of an ink jet printer.

BACKGROUND OF THE DISCLOSURE

Card products include, for example, credit cards, identification cards, driver's licenses, passports, and other card products. Such card products generally include printed information, such as a photo, account numbers, identification numbers, and other personal information. Credentials can also include data that is encoded in a smartcard chip, a magnetic stripe, or a barcode, for example.

Card production systems include processing devices that process card substrates (hereinafter "cards") to form the final card product. Such processes may include a printing process, a laminating or transfer process, a data reading process, a data writing process, and/or other process used to form the desired credential. An ink jet card printer is a form of card production system that utilizes an ink jet print head to print images to cards.

Ink overspray can occur when the ink jet print head prints near a edge of the print media or substrate. If unprotected, the ink overspray can land and accumulate on components of the ink jet card printer and can negatively affect printer performance as well as print quality of not removed from the components. Conventional printers have employed ink overspray collectors because cleaning ink from intricate components can be a time consuming and cumbersome task. Some ink overspray collectors are disposable and add additional waste to ink jet card printer processes. Non-disposable ink overspray collectors can be time consuming to remove, time consuming to clean, and time consuming to replace. Additionally, non-disposable ink overspray collectors can easily be damaged which can further complicate removal and replacement.

SUMMARY OF THE DISCLOSURE

Techniques for handling and reducing ink overspray of an ink jet printer are provided. In an example, an ink overspray collector for an ink jet printer can include a first opening defining a first print area of the ink jet printer, and a frame about the first opening. The frame is configured to receive overspray from operation of the ink jet printer and can be formed of a woven material.

DETAILED DESCRIPTION

Examples of the present disclosure are generally directed to reducing and handling overspray of an ink jet card printer. In certain examples, the ink jet card printer can include an ink overspray collector that can be easily removed, cleaned and re-installed. In some examples, a controller of the ink jet card printer can execute commands that cause the ink jet card printer to reduce the amount of ink deposited at the edges of the card from the amount that would normally be deposited for a given image so that overspray of the ink is reduced. In some examples, a combination of techniques can be used to reduce overspray and reduce waste generated by operation of ink jet card printer.

Figure 1:
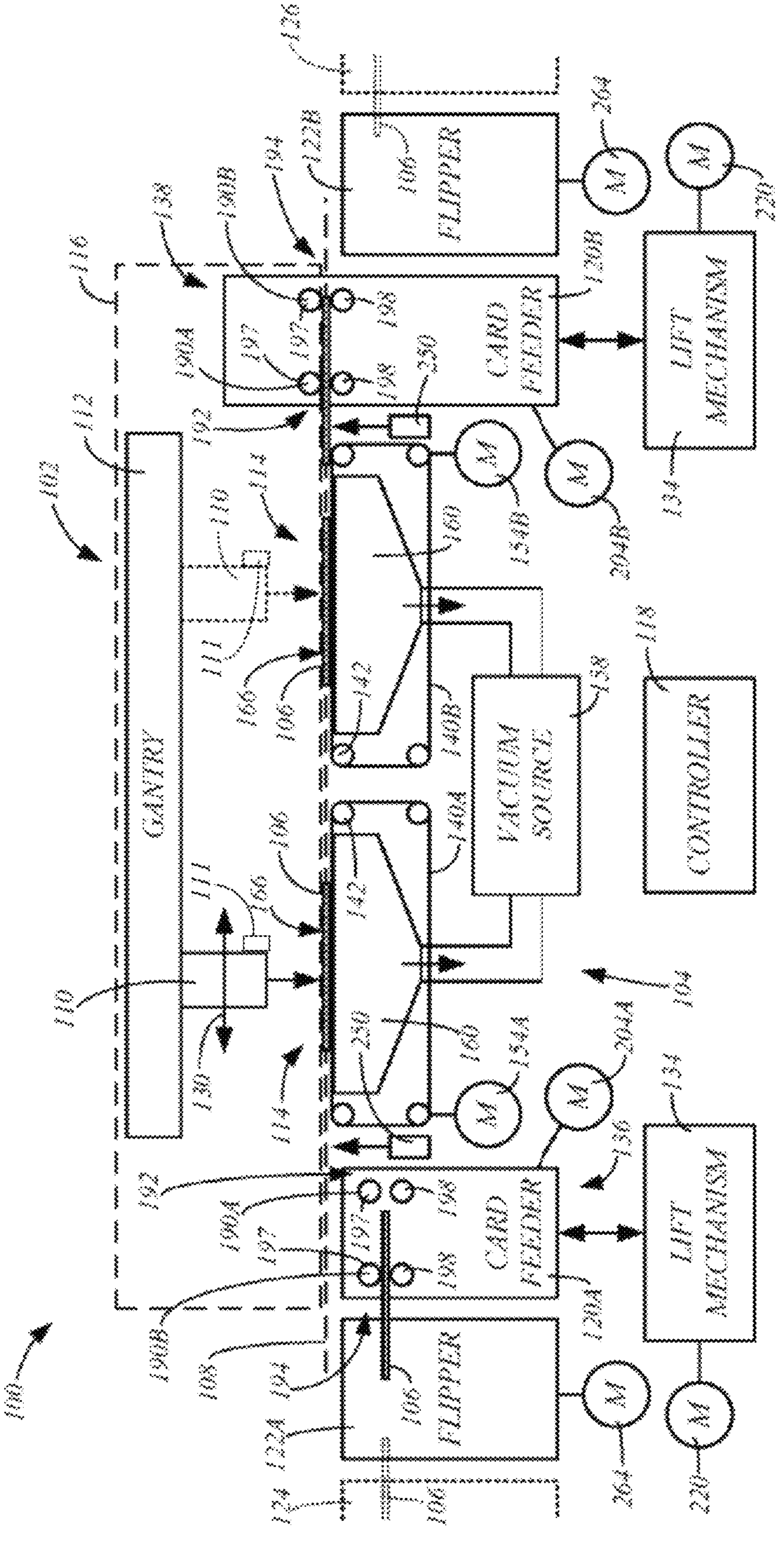
FIG. 1 illustrates generally a block diagram side view of an example ink jet card printer according to the present subject matter.
Figure 2:
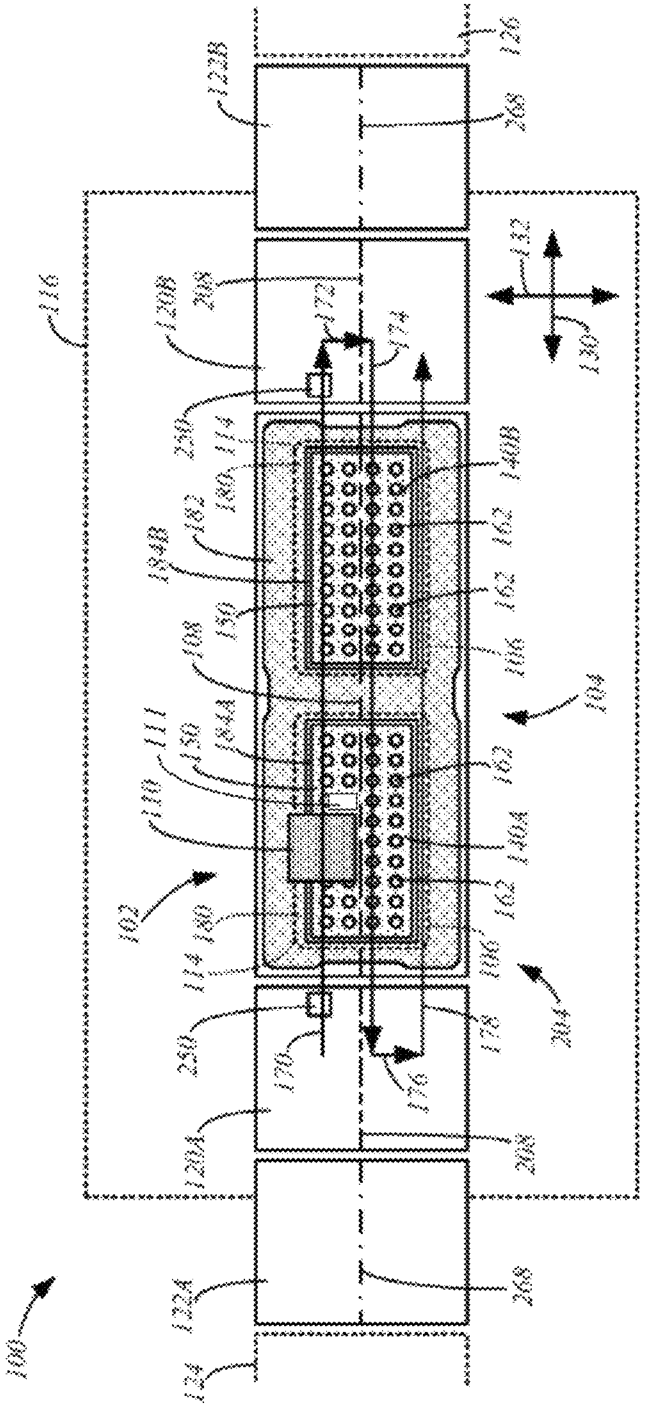
FIG. 2 illustrates generally a top view of an example ink jet card printer according to the present subject matter.

FIGS. 1 and 2 are simplified side and top views of an ink jet card printer 100, or portions thereof, in accordance with the present subject matter. In some examples, the ink jet card printer 100 includes a print unit 102, and a card transport 104. The card transport 104 is configured to feed individual cards 106 along a processing axis 108. The print unit 102 includes an ink jet print head 110 and a gantry 112. The print head 110 is configured to perform a printing operation on individual cards 106 supported by the card transport 104 in a print position 114 along the processing axis 108. The gantry 112 is configured to move the print head 110 through a print zone 116 during printing operations.

In some examples, the ink jet card printer 100 includes a controller 118, which represents one or more distinct controllers of the ink jet card printer 100, each of which includes at least one processor that is configured to execute program instructions stored in a computer-readable media or memory of the ink jet card printer 100, which may also be represented by the controller 118, or another location. Any suitable patent subject matter eligible computer readable media or memory may be utilized including, for example, hard disks, CD-ROMS, optical storage devices, flash memory, magnetic storage devices, or other suitable computer readable media or memory that do not include transitory waves or signals. The execution of the instructions by the controller 118 controls components of the ink jet card printer 100 to perform functions and method steps described herein.

In certain examples, the ink jet card printer 100 may include one or more card feeders 120, such as card feeders 120A and 120B, that are each configured to deliver cards 106 to, and receive cards 106 from, the card transport 104. The ink jet card printer 100 may also include one or more card flippers 122, such as flippers 122A and 122B, that are configured to invert the cards 106. A card supply 124, such as a card cartridge containing a stack of cards, may be provided to supply cards 106 for processing by the ink jet card printer 100, and processed cards may be discharged and collected by a suitable card collector (e.g., a hopper) 126.

The ink jet print head 110 is configured to perform a direct printing operation to individual cards 106 supported in the print positions 114 along the processing axis 108. The gantry 112 can move the print head 110 along a first scan axis 130 that is substantially parallel to the processing axis 108, and a second scan axis 132 that is substantially perpendicular to the processing axis 108, as shown in FIG. 2, during printing operations. As used herein, the term "first scan axis" refers to the axis along which the print head 110 is moved by the gantry 112 during an active printing phase of the operation, during which ink is discharged from the print head 110 to form the image on the card 106. The term "second scan axis" refers to the axis along which the print head 110 can be moved by the gantry 112 during an inactive printing phase (ink is not discharged from the print head) to position the print head 110 for the next active printing phase.

In certain examples, the gantry 112 and the print head 110 may occupy the print zone 116 during printing operations, which is indicated by dashed boxes in FIGS. 1 and 2. The print zone 116 may generally extend from the processing axis 108, or immediately above the processing axis 108, into at least a portion of the space above the card transport 104 and the card feeders 120. The print zone 116 may also surround the card transport 104 and the card feeders 120, as shown in FIG. 2.

Figure 3:
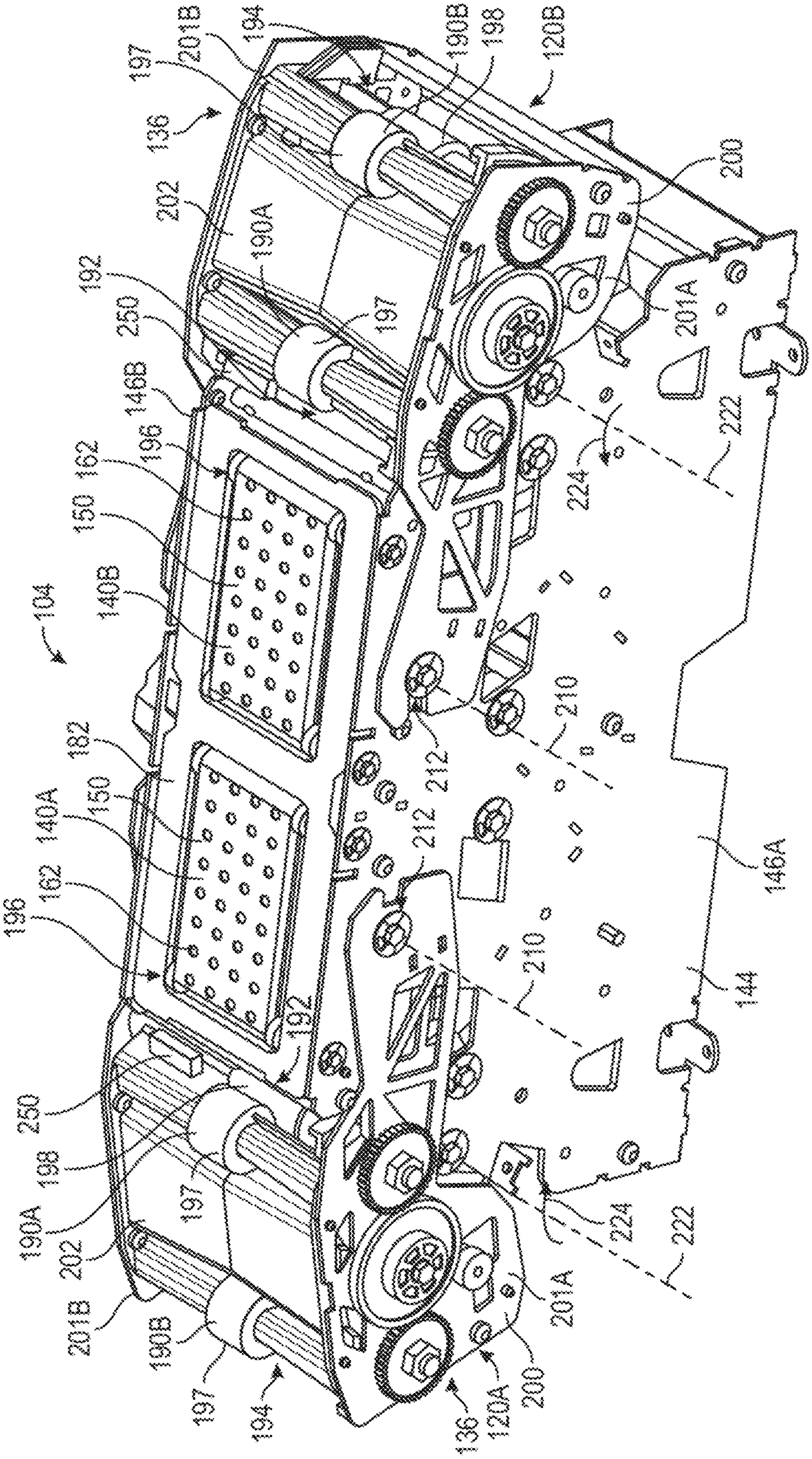
FIG. 3 illustrates generally a perspective view of a card transport of an example ink jet card printer according to the present subject matter.

In certain examples, the card feeders 120 each include a lift mechanism 134 to move the card feeders 120 to a lowered position, in which the card feeders 120 are displaced from the print zone 116, such as below the print zone 116, as indicated by card feeder 120A in FIG. 1, and the card feeders 120A and 120B in FIG. 3. FIG. 3 is an isometric view of a card transport 104 and card feeders 120 in their lowered positions 136.

The lift mechanisms 134 may also move the card feeders 120 to a raised position, in which at least a portion of the card feeders 120 extend into the print zone 116, and the card feeders 120 are positioned to feed cards 106 to, or receive cards 106 from, the card transport 104, as indicated by the card feeder 120B in FIG. 1. Thus, the card feeders 120 may be moved to their raised positions by the lift mechanisms 134 to facilitate feeding cards 106 to or receiving cards 106 from the card transport 104.

Thus, the lift mechanisms 134 may be used to move the card feeders 120 from their raised positions, in which at least a portion of the card feeders 120 would obstruct a printing operation, to their lowered positions, in which the card feeders 120 do not obstruct the print zone 116, to enable the print head 110 to be moved through the print zone 116 by the gantry 112 and perform a printing operation.

In certain examples, the card transport 104 includes belts 140, such as first and second belts 140A and 140B (i.e., belt feeders or conveyors), that are each supported by rollers 142 for movement along a belt path. In one example, the first and second belts 140A and 140B are each supported by four rollers 142, which are supported by a belt frame 144, such as side walls 146A and 146B of the belt frame 144 (FIG. 3). The belts 140 include exposed portions 150 adjacent the processing axis 108. The exposed portion 150 of each of the belts 140 is used to feed the cards 106 along the processing axis 108 and support the cards 106 in the print positions 114.

Motors 154A and 154B can independently drive the first and second belts 140A and 140B along their belt paths. Thus, the exposed portion 150 of the first belt 140A may independently feed a card 106 along the processing axis 108 in a direction toward the second belt 140B or in a direction toward the card feeder 120A using the motor 154A, and the exposed portion 150 of the second belt 140B may independently feed a card 106 along the processing axis 108 in the direction toward the first belt 140A, or in the direction toward the card feeder 120B using the motor 154B.

The belts 140 of the card transport 104 may take on any suitable form. In certain examples, the belts 140 are conventional vacuum belts that are coupled to a vacuum source 158 (i.e., a source of negative pressure), such as a regenerative vacuum blower. The vacuum source 158 may be shared by the belts 140, as shown in FIG. 1, or separate vacuum sources 158A and 158B may respectively be used by the belts 140A and 140B. Chambers 160 couple the negative pressure generated by the vacuum source 158 to the exposed portions 150 of the belts 140. The negative pressure is communicated to a top side of the exposed portions 150 through apertures 162 in the belts, which are shown in FIGS. 2 and 3, and is used to secure cards 106 to the exposed portions 150 during card feeding and printing operations. Thus, when a card 106 engages the top surface of the exposed portion 150 of one of the belts 140, the negative pressure generated by the vacuum source 158 or sources 158A and 158B adheres the card 106 to the belt 140. When the belts 140 are driven by the corresponding motor 154, the adhered card 106 is driven along the processing axis 108.

For example, referring to FIG. 2, with the card feeders 120 in their lowered positions, and the cards 106 held in the print positions 114 against the exposed portions 150 of the belts 140A and 140B due to the negative pressure generated by the vacuum source 158 or sources 158A and 158B, the gantry 112 may move the print head 110 along the first scan axis 130 (processing axis 108) over the cards 106, while the print head 110 prints image lines to the surfaces 166, as indicted by arrow 170. After the print head 110 is moved past the end of the card 106 adjacent the card feeder 120B, the gantry 112 shifts the print head 110 along the second scan axis 132, as indicated by arrow 172. The gantry 112 then moves the print head 110 back along the first scan axis 130 (arrow 174), during which the print head 110 prints image lines to the surfaces 166 of the cards 106. The gantry 112 again shifts the position of the print head 110 along the second scan axis 132 (arrow 176), and the print head 110 prints image lines as the gantry 112 moves the print head 110 along the first scan axis 130 (arrow 178). These steps of printing image lines while moving the print head 110 along the first scan axis 130 and shifting the position of the print head 110 along the second scan axis 132, are repeated until the images have been printed to the surfaces 166 of the cards 106. Accordingly, a single print operation may simultaneously print images to two cards 106 supported on the belts 140.

To print a full edge-to-edge image on a card 106, the print head 110 may be configured to print an image that is slightly larger than the surface 166 of the card 106. As a result, some ink will overspray the edges of the card 106.

In certain examples, the exposed surface 150 of each belt 140 has a smaller surface area than the card 106. That is, the width and length of the exposed belt surfaces 150 are selected such that they are less than the corresponding width and length of the cards 106, as generally shown in FIG. 2 with the cards 106 shown in phantom lines. Thus, when a card 106 is in the print position 114, the entirety of the exposed belt surface 150 is covered by the card 106, and a perimeter portion 180 of the card 160 extends beyond the edges of the exposed belt surface 150. This allows the print head 110 to print images that extend to the edges of the surfaces 166 of cards 106 while protecting the exposed belt surface 150 from ink contamination.

In certain examples, the card feeders 120 each include at least one pinch roller pair 190, such as pinch roller pairs 190A and 190B. In certain examples, at least a portion of one or both of the pinch roller pairs 200 extends into the print zone 116 when the card feeder 120 is in a raised position. The pinch roller pairs 190A and 190B are respectively positioned adjacent ports 192 and 194 of the card feeder 120, with the port 192 being positioned adjacent an input/output end 196 of the corresponding belt 140, as shown in FIG. 3. Each pinch roller pair 190 may include an idler roller 197 and a motorized feed roller 198 that are supported by a card feeder frame 200, such as between side walls 201A and 201B of the frame 200, as shown in FIG. 3. While the idler roller 197 is illustrated as being the top roller in the provided examples, it is understood that the positions of the rollers 197 and 198 may be reversed. A cover 202 may be positioned between the pinch roller pairs 190A and 190B to cover a portion of the path through which cards 106 are fed through the card feeder 120, as shown in FIG. 3.

The card feeders 120A and 120B respectively include motors 204A and 204B for driving the motorized rollers 198 to feed a card 106 supported between one or both of the pinch roller pairs 190A and 190B along a card feed axis 208. The separate motors 204 of the feeders 120 allow the controller 118 to independently control the card feeders 120. As a result, the card feeder 120A may be used to deliver a card 106 to the belt 140A while the card feeder 120B delivers a card 106 to the collector 126, for example.

The card feed axis 208 of each feeder 120 is substantially parallel to a vertical plane extending through the processing axis 108. Thus, as shown in the top view of FIG. 2, the card feed axes 208 of the feeders 120 are oriented substantially parallel (e.g., +-0.5 degrees) to the processing axis 108 within a horizontal plane.

In certain examples, the lift mechanisms 134 pivot the frame 200 of the card feeders 120 about a pivot axis 210 (FIG. 3) during movement of the card feeders 120 between their raised and lowered positions. As a result, the orientation of the card feed axis 208 relative to the processing axis 108 in a vertical plane changes with movement of the card feeders 120 between their raised and lowered positions 138 and 136. When the card feeder 120 is in its lowered position, the card feed axis 208 is at an oblique angle (e.g., 20-50 degrees) to the processing axis 108 in the vertical plane. When the card feeder 120 is in its raised position, the card feed axis 208 is substantially parallel to the processing axis 108 in the vertical plane, allowing the card feeder 120 to deliver a card 106 to the adjacent belt 140, or receive a card 106 from the adjacent belt 140 using one or more of the pinch roller pairs 190.

In certain examples, the pivot axis 210 is defined by a pivotable connection 212 between the card feeder frame 200 and the belt frame 144, as indicated in FIG. 3. In one example, the pivotable connection or hinge 212 is formed between the side walls 201A and 201B of the card feeder frame 200 and the corresponding side walls 146A and 146B of the belt frame 144.

During an exemplary lift operation, in which the card feeder 120 is moved from the lowered position to the raised position, the controller 118 activates the motor 220 of the lift mechanism 134 to drive rotation of a cam (not shown) about the axis 222 in the direction indicated by arrow 224 in FIG. 3. As the cam rotates, it drives the card feeder frame 120 to pivot about the pivot axis 210 until the card feeder 120 reaches the raised position. The operation is reversed to move the card feeder 120 back to its lowered position.

Ideally, each card feeder 120 supports a received card 106 such that a central axis of the card 106 is aligned with the card feed axis 208. This ensures that the card 106 is fed to the adjacent belt 140 in alignment with the processing axis 108, which allows for accurate positioning of the card 106 in the print position 114 on the belt 140 and accurate printing of an image to the card surface 166.

The printer 100 may include one or more sensors 250 to facilitate various card feeding operations, such as receiving a card 106 in the card feeders 120 and positioning a card 106 in the print position 114 on the belts 140. In one example, the printer 100 includes a card sensor 250 for detecting the presence or absence of a card at each side of the card transport 104. In certain examples, the card sensors 250 are positioned between the pinch roller pair 190A and the adjacent belt 140. In certain examples, the card sensors 250 are supported by the card feeder frame 200.

During reception of a card 106 by a card feeder 120 in its lowered position, the sensor 250 may be used to detect the leading edge of the card 106 being fed toward the card transport belt 140, which may indicate that the card 106 is fully received in the card feeder 120. The card feeder 120 may then be moved from the lowered position to the raised position. After the card feeder 120 is moved to the raised position, the corresponding card sensor 250 may be used to detect the trailing edge of the card 106 as the card is fed to the adjacent belt 140. The controller 118 may use this detection of the trailing edge of the card 106 to control the belt 140 to position the card 106 in the desired print position 114.

The card sensors 250 may also be used by the controller 118 to control the reception of cards 106 fed from the belts 140 by the card feeders 120. For example, as a card 106 is fed from the belt 140 toward the card feeder 120, the card sensor 250 may detect the leading edge of the card 106. This detection may be used by the controller 118 to control the pinch roller pairs 190 to receive the card 106 in the card feeder 120. The card 106 may then be fed into the card feeder 120 using the pinch roller pairs 190 until the sensor 250 detects the trailing edge of the card 106 indicating that the card 106 has been fully received within the card feeder 120 and that the card feeder 120 is ready to be moved to its lowered position 136.

As mentioned above, the printer may optionally include one or more card flippers 122 driven by one or more motors 264 that may be used to invert cards 106 to facilitate printing operations on both sides of the cards 106. Each card flipper 122 may be configured to receive a card 106 from the adjacent card feeder 120, the card supply (flipper 122A) or the card collector (flipper 122B), rotate the card 106 about a flipping axis 260 to invert the card 106, and pass the inverted card 106 back to the adjacent card feeder 120, which can deliver the inverted card 106 to the card transport 104 and the print unit 102 for a printing operation.

Some examples of the present disclosure are directed to methods of printing an image to one or more cards 106 using the ink jet card printer 100. In one example of the method, a card 106, which may have been received from the supply 124 and fed to the card feeder 120A by the card flipper 122A, is supported by the pinch roller pairs 190 of the card feeder 120A while in its lowered position. The card feeder 120A is moved to its raised position using the corresponding lift mechanism 134, and the card 106 is discharged from the card feeder 120A to the belt 140A using the pinch roller pair 190A. The card feeder 120A is then moved to the lowered position and out of the print zone 116 using the lift mechanism 134, and the card 106 is fed along the processing axis 108 by the belt 140A to the print position 114 (FIG. 2). An image is then printed to the surface 166 of the card 106 using the print head 110, which involves moving the print head 110 with the gantry 112 through the print zone 116.

In certain examples, the ink jet card printer 100 can include a cure light 111 to assist in hardening recently ejected ink. Such a cure light 111 can project ultraviolet (UV) light for curing UV-curable inks. In some examples, the cure light 111 can be attached to the ink jet print head 110 and can move with the ink jet print head 110. In some examples, the cure light 111 is attached to an axis separate from the ink jet print head axis and can move independent of the ink jet print head 110. In operation, after an image is printed, conventional systems pass an illuminated cure light across the entire width or length of the printed media to cure, or harden, the printed ink. For an ink jet printer according to the present subject matter, after printing of an image onto print media using curable ink, the cure light 111 can be passed over the image at a cure speed and can be moved over unprinted portions of the print media, or retracted over cured portions if the image, at a speed higher than the cure speed.

In certain examples, the printer 100 includes an ink overspray collector 182 that surrounds a perimeter of the exposed belt surface 150 and extends beyond the edges of the cards 106 when in their print positions 114, as shown in FIG. 2. Thus, the collector 182 is positioned to receive ink that is sprayed over the lengthwise and widthwise edges of the cards 106 during a printing operation. In certain examples, the surface of the ink overspray collector 182 configured to receive the overspray ink is positioned below or offset some distance, x, from the bottom surface of the card 106 to be printed to allow for ink buildup. The offset can allow a finished card to pass over ink buildup on the ink overspray collector 182 without the overspray ink transferring to the underside of the finished card or to the underside of a new card entering the print area. In certain examples, the ink overspray collector 182 is a disposable component that may be periodically removed and replaced by an operator of the printer 100. The collector 182 may be formed of plastic, paper, cardboard, or another suitable material. In certain examples, the collector 182 is a single piece of material having an opening 184A for the exposed belt surface 150 of the belt 140A, and an opening 184B for the exposed belt surface 150 of the belt 140B.

In certain examples, the ink overspray collector 182 is a reusable component that can be easily cleaned and reused to reduce waste production of the ink jet printer. In certain examples, the ink overspray collector 182 can include a coated material that allows the overspray ink to be removed relatively quickly and/or easily (e.g., in seconds). In some examples, the reusable component is stiff enough to maintain its shape when installed and laden with overspray ink, but also flexible enough to allow easy removal from the machine, easy removal of ink from the surface of the component, and easy installation back onto the machine. In some examples, the material of the ink overspray collector 182 is a woven material with a coating that has low adhesion with the ink such that the overspray ink can adhere to the ink overspray collector during operation, but the ink can easily be separated from the surface of the ink overspray collector during a short break in the operation of the ink jet printer. In some examples, the woven material can include fiberglass. In some examples, the coating can include polytetrafluoroethylene (PTFE).

Figure 4:
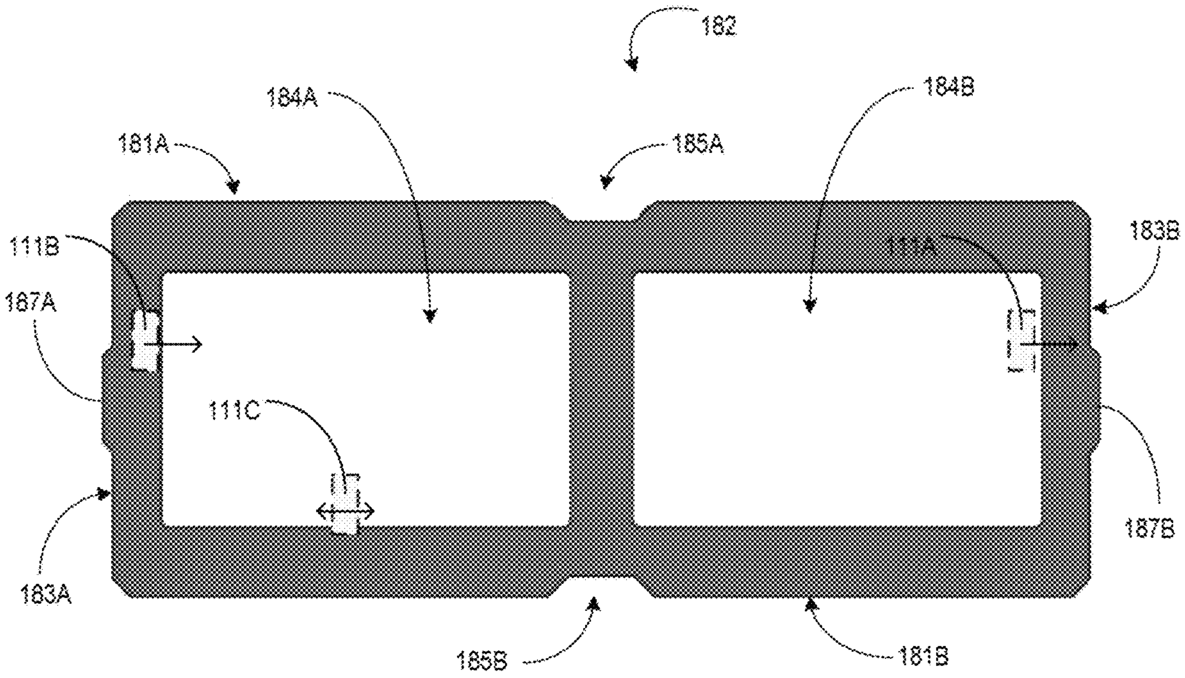
FIG. 4 illustrates generally an example ink overspray collector according to the present subject matter.

FIG. 4 illustrates generally an example ink overspray collector. The ink overspray collector 182 can include openings 184A, 184B for the corresponding exposed belt surfaces 150 of the corresponding belt 140A, 140B. In certain examples, the openings 184A, 184B closely extend with the shape of the print media, such that as the print media is being printed, the corresponding belt 140A, 140B is not exposed to receiving ink overspray. The ink overspray collector 182 can have a pair of long sides 181A, 181B and a pair of short sides 183A, 183B arranged generally in a rectangular form or footprint. Each long side 183A, 183B can include an optional inward notch 185A, 185B. Each short side can include an optional outward notch 187A, 187B. In certain examples, upon installation in an ink jet card printer, one or more of the inward notches 185A, 185B or outward notches 187A, 187B can be captured or used to secure the ink overspray collector 182 in a proper position.

In certain examples, the ink overspray collector 182 can be symmetrical about a centerline running parallel with the long sides 181A, 181B. In some examples, the ink overspray collector 182 can be symmetrical about a centerline running parallel with the short sides 183A, 183B. Symmetry of the ink overspray collector can allow for proper installation to the ink jet card printer in more than one orientation which can save time.

It is understood that examples of an ink overspray collector can include more opening or less openings than the example of FIG. 4 without departing from the scope of the present subject matter. The rectangular shaped footprint of the illustrated ink overspray collector 184 works well to cover mechanisms of the ink jet card printer and protect those mechanisms from ink overspray. It is understood that mechanisms of other ink jet card printers may be better protected from ink overspray from and ink overspray collector with a footprint that is in a shape other than the illustrated rectangular shape and such ink overspray collectors do not depart from the scope of the present subject matter. It is further understood that an ink overspray collector can have additional or other tabs for securing the ink overspray collector without departing from the scope of the present subject matter In some examples, the controller of an example ink jet card printer can also assist in handling ink overspray, for example, by reducing the amount of overspray. In certain examples, generally, as the position of the ink jet print head approaches the edge of the print area, the controller can provide overspray modulation. Overspray modulation of the ink can include reducing the amount of ink dispensed near the edge of the print media or print area of the printer compared to an amount of ink that would otherwise be dispensed without overspray modulation. Using less ink than would otherwise be dispensed without overspray modulation can reduce the amount of ink overspray.

In some examples, overspray modulation of the dispensing of the ink from the printhead can include reducing the number of ink droplets compared to the number requested to provide the full image being printed. In some examples, overspray modulation of the dispensing of the ink from the printhead can include reducing the size of ink droplets compared to the size requested to provide the full image being printed. In some examples, modulation of the dispensing of the ink from the printhead can include reducing the number of ink droplets of certain colors such that the edge of the image fades into the background color provided by the surface of the print media. In some examples, overspray modulation can include one or more of the above techniques in combination with each other. In certain examples, the overspray techniques are applied to nozzles of the print head that dispense ink within a certain distance of the edge of the print media while printing a given image. In various examples, the certain distance is less than 20 millimeters (mm), less than 10 mm, less than 5 mm, or less than 2 mm from the edge of the print media or from the edge of the print area.

Figure 5:
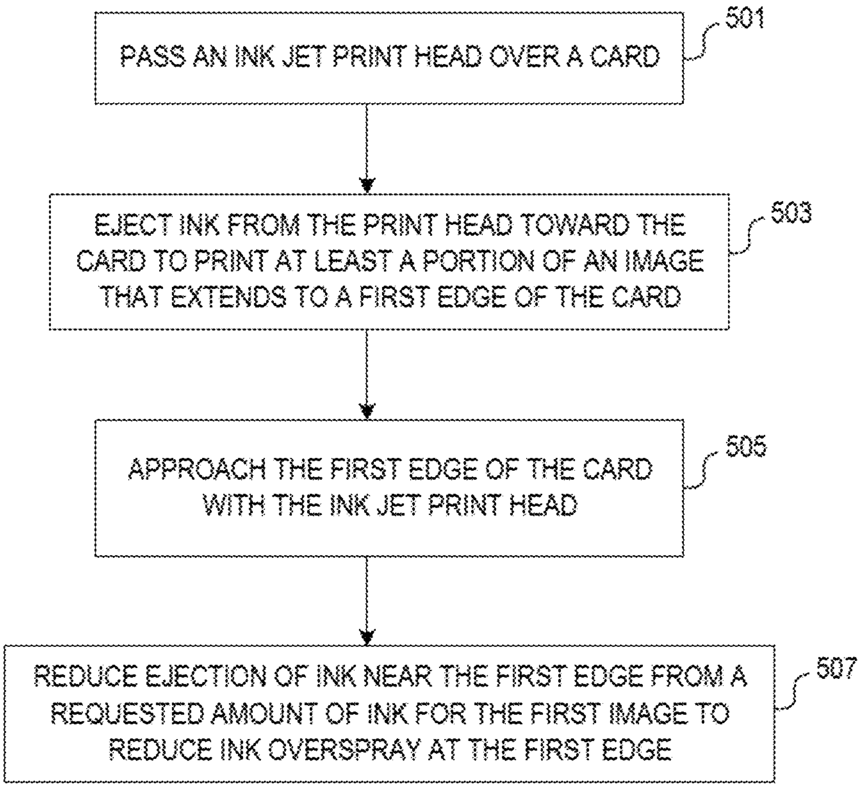
FIG. 5 illustrates generally an example method of modulating ink deposition to reduce ink overspray.

FIG. 5 illustrates generally an example method of reducing ink overspray. At 501, an ink jet print head can pass over a card. At 503, in response to the ink jet print head passing over the card, ink can be ejected toward the card to print at least a portion of an image. The image can extend to a first edge of the card that is perpendicular to the direction of travel of the ink jet print head. At 505, the ink jet print head can approach the first edge of the card. At 507, ejection of ink is reduced, or begins to be reduced, at a certain distance from the first edge from a requested amount of ink to reduce ink overspray at the first edge. In certain examples, the certain distance can be less than 20 millimeters (mm), less than 10 mm, less than 5 mm, or less than 2 mm from the edge of the print media or from the edge of the print area. As used herein, the requested amount of ink is the amount of ink that would be dispensed if an overspray reduction method were not employed. In certain examples, the reduction of ink from the requested amount of ink can take the form of reducing the number of ink droplets from the requested number of ink droplets to form the image, reducing the size of ink droplets from the size of ink droplets requested to form the image, reducing the number of certain color ink droplets to fade the image to the color of the surface of the card, or combinations thereof. FIG. 4 illustrates a generally an example location and relative direction of travel of an ink jet print head 111A when the controller may invoke the ink reduction method of FIG. 5.

Figure 6:
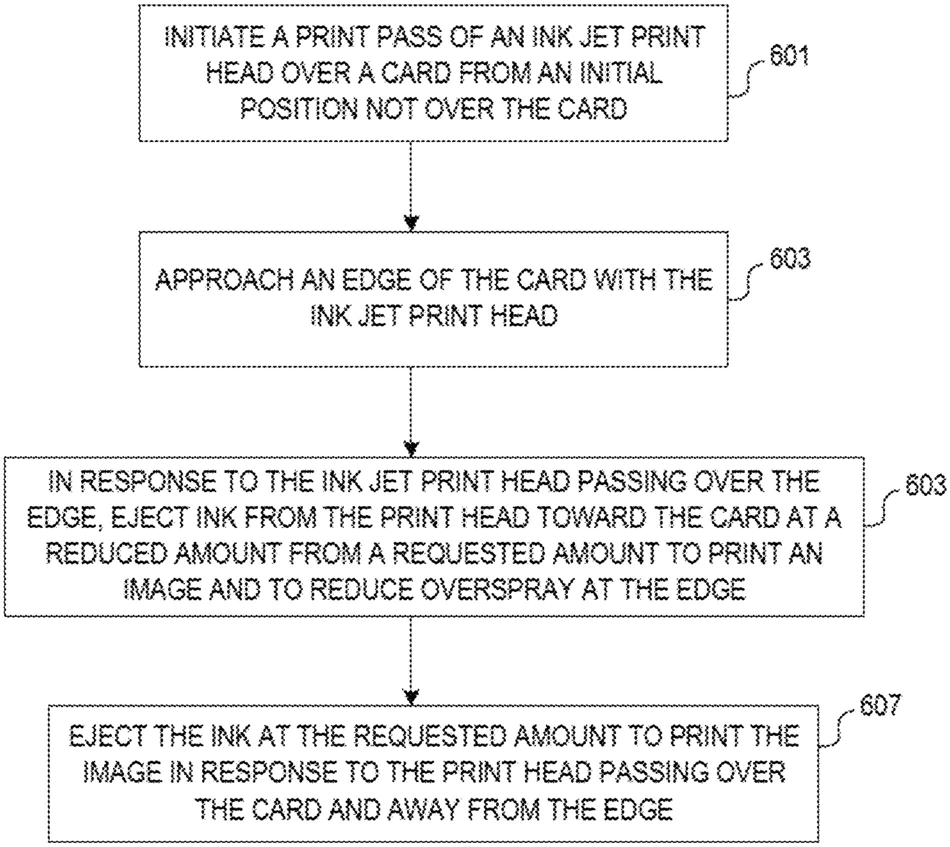
FIG. 6 illustrates generally an example method of modulating ink deposition to reduce ink overspray.

FIG. 6 illustrates generally an example method of reducing ink overspray. At 601, an ink jet print head can initiate a pass over a card to print an image on the card from an initial position not over the card. At 603, the ink jet print head can approach a first edge of the card perpendicular to the direction of travel of the ink jet print head. The image can extend from the first edge of the card. At 605, ejection of ink is reduced near the first edge from a requested amount of ink to form the image to reduce ink overspray at the first edge. At 607, ink can be ejected toward the card according to the requested amount of ink to print at least a portion of the image as the print head passes over the card and away from the first edge by a certain distance. In certain examples, the certain distance can be more than 20 millimeters (mm), more than 10 mm, more than 5 mm, or more than 2 mm from the edge of the print media or from the edge of the print area. In certain examples, the reduction of ink from the requested amount of ink can take the form of reducing the number of ink droplets from the requested number of ink droplets to form the image, reducing the size of ink droplets from the size of ink droplets requested to form the image, reducing the number of certain color ink droplets to fade the image to the color of the surface of the card, or combinations thereof. As the print head passes over the card and toward the center of the card near the first edge, the amount of reduction of the ink can be decreased to the requested amount when the probability of significant ink overspray at the first edge is eliminated. FIG. 4 illustrates a generally an example location and relative direction of travel of an ink jet print head 111B when the controller may invoke the ink reduction method of FIG. 6.

Figure 7:
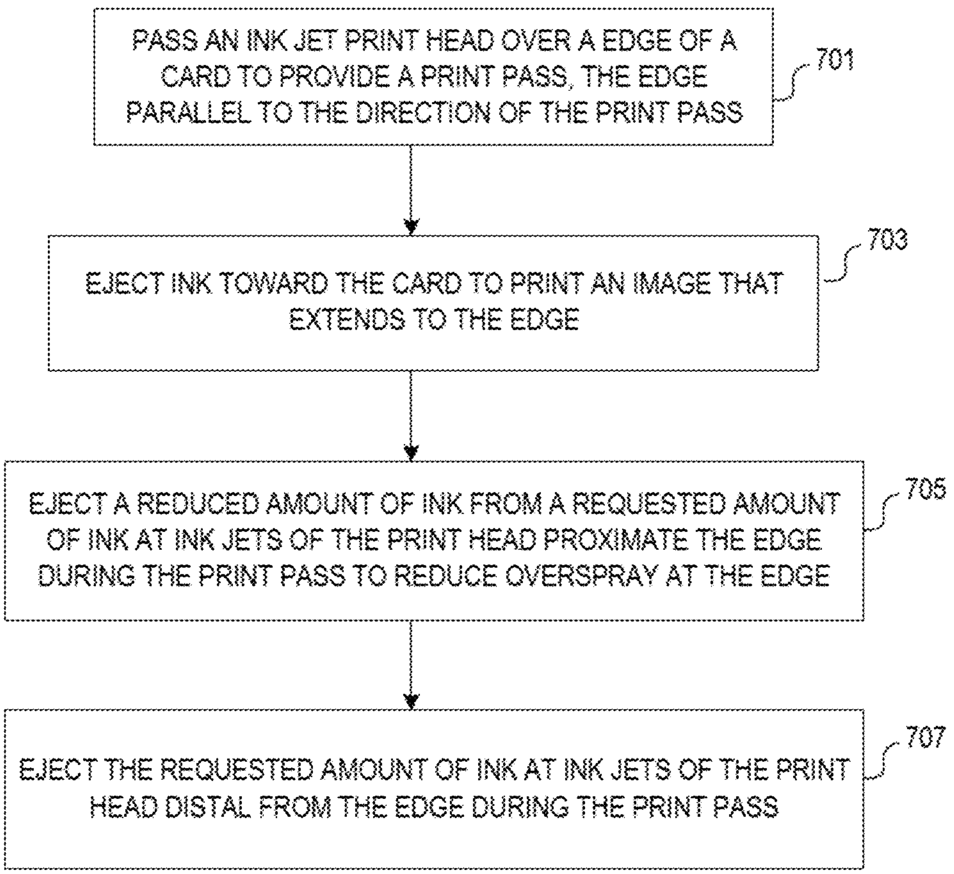
FIG. 7 illustrates generally an example method of modulating ink deposition to reduce ink overspray.

FIG. 7 illustrates generally an example method of reducing ink overspray. At 701, an ink jet print head can execute a print pass over a first edge. The first edge can be parallel with the direction of travel of the ink jet print head. At 703, ink can be ejected toward the card during the print pass to print at least a portion of an image. The image can extend from the first edge of the card. At 705, ejection of ink from ink jets of the print head proximate the edge can be reduced from a requested amount of ink to form the image and to reduce ink overspray at the first edge. In certain examples, the reduction of ink from the requested amount of ink can take the form of reducing the number of ink droplets from the requested number of ink droplets to form the image, reducing the size of ink droplets from the size of ink droplets requested to form the image, reducing the number of certain color ink droplets to fade the image to the color of the surface of the card, or combinations thereof. At 707, ejection of ink from ink jets of the print head distal from the edge can be at the requested amount of ink during the print pass to form the image. FIG. 4 illustrates a generally an example location and relative direction of travel of an ink jet print head 111C when the controller may invoke the ink reduction method of FIG. 7.

EXAMPLES AND NOTES

In a first example, Example 1, an apparatus for an ink jet printer, the apparatus comprising: a first opening defining a first print area of the ink jet printer; a frame about the first opening configured to receive overspray from operation of the ink jet printer; and wherein the frame is formed of a woven material.

In Example 2, the subject matter of Example 1 includes, wherein the frame is coated with polytetrafluoroethylene (PTFE).

In Example 3, the subject matter of Examples 1-2 includes, a second opening defining a second print area of the ink jet printer; and wherein the frame extends about the second opening to receive the overspray.

In Example 4, the subject matter of Examples 1-3 includes, wherein the frame defines a rectangular footprint and the rectangular footprint includes first and second long sides and first and second short sides.

In Example 5, the subject matter of Example 4 includes, wherein the first and second long sides include an inward notch.

In Example 6, the subject matter of Example 5 includes, wherein the apparatus is symmetrical about a centerline bisecting the first and second long sides; and wherein the apparatus is symmetrical about a centerline bisecting the first and second short sides.

In Example 7, the subject matter of Examples 4-6 includes, wherein the apparatus is symmetrical about a centerline bisecting the first and second long sides.

In Example 8, the subject matter of Examples 4-7 includes, wherein the apparatus is symmetrical about a centerline bisecting the first and second short sides.

In Example 9, the subject matter of Examples 1-8 includes, wherein the frame is formed of woven fiberglass.

Example 10 is a method for operating an ink jet printer, the method comprising: moving an ink jet print head across a card to print at least a portion of an image onto the card; ejecting ink from ink jets of the ink jet print head toward the card at a requested amount of ink in response to the ink jet print head passing over the card; and reducing an amount of ink ejected from the ink jet print head to print the at least a portion of the image from the requested amount of ink in response to the print head printing the at least a portion near an edge of the card to reduce ink overspray past the edge.

In Example 11, the subject matter of Example 10 includes, wherein the reducing the amount of ink ejected includes reducing a number of ink droplets ejected from the ink jet print head compared to a number of droplets for the requested amount of ink for the image.

In Example 12, the subject matter of Examples 10-11 includes, wherein reducing the amount of ink ejected includes reducing a droplet size of the ink ejected from the ink jet print head compared to a size of the droplet for the requested amount of ink for the image.

In Example 13, the subject matter of Examples 10-12 includes, wherein reducing the amount of ink ejected includes reducing a number of droplets of a color of ink ejected from the ink jet print head compared to a number of droplets for the color for the requested amount of ink to fade the image into a color of a surface of the card near the edge, and to reduce ink overspray at the edge.

In Example 14, the subject matter of Examples 10-13 includes, wherein the edge is perpendicular to a direction of movement of the ink jet print head with respect to the card.

In Example 15, the subject matter of Examples 10-14 includes, wherein the edge is parallel to a direction of movement of the ink jet print head with respect to the card.

In Example 16, the subject matter of Example 15 includes, wherein the reducing the amount of ink ejected includes reducing a number of ink droplets ejected from ink jets of the ink jet print head proximate the edge compared to a number of droplets for the requested amount of ink for the image to reduce ink overspray at the edge.

In Example 17, the subject matter of Examples 15-16 includes, wherein reducing the amount of ink ejected includes reducing a droplet size of the ink ejected from ink jets of the ink jet print head proximate the edge compared to a size of the droplet for the requested amount of ink for the image to reduce ink overspray at the edge.

In Example 18, the subject matter of Examples 15-17 includes, wherein reducing the amount of ink ejected includes reducing a number of droplets of a color of ink ejected from ink jets of the ink jet print head proximate the edge compared to a number of droplets for the color for the requested amount of ink to fade the image into a color of a surface of the card near the edge, and to reduce ink overspray at the edge.

Example 19 is a machine-readable medium including instructions that, when executed by processing circuitry, cause the processing circuitry to perform operations, the operations comprising: moving an ink jet print head across a card to print at least a portion of an image onto the card; ejecting ink from ink jets of the ink jet print head toward the card at a requested amount of ink in response to the ink jet print head passing over the card; and reducing an amount of ink ejected from the ink jet print head to print the at least a portion of the image from the requested amount of ink in response to the print head printing the at least a portion near an edge of the card to reduce ink overspray past the edge.

In Example 20, the subject matter of Example 19 includes, wherein the operation of reducing the amount of ink ejected includes reducing a number of ink droplets ejected from ink jets of the ink jet print head proximate the edge compared to a number of droplets for the requested amount of ink for the image to reduce ink overspray at the edge.

In Example 21, the subject matter of Examples 19-20 includes, wherein the operation of reducing the amount of ink ejected includes reducing a droplet size of the ink ejected from ink jets of the ink jet print head proximate the edge compared to a size of the droplet for the requested amount of ink for the image to reduce ink overspray at the edge.

In Example 22, the subject matter of Examples 19-21 includes, wherein the operation of reducing the amount of ink ejected includes reducing a number of droplets of a color of ink ejected from ink jets of the ink jet print head proximate the edge compared to a number of droplets for the color for the requested amount of ink to fade the image into a color of a surface of the card near the edge, and to reduce ink overspray at the edge.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

What is claimed is:

1. An apparatus for an ink jet printer, the apparatus comprising:

a first opening defining a first print area of the ink jet printer; and a frame about the first opening configured to receive overspray from operation of the ink jet printer, the frame formed of a woven material having a coating with low adhesion with ink.

2. The apparatus of claim 1, wherein the frame is coated with polytetrafluoroethylene (PTFE).

3. The apparatus of claim 1, including a second opening defining a second print area of the ink jet printer, wherein the frame extends about the second opening to receive the overspray.

4. The apparatus of claim 1, wherein the frame defines a generally rectangular footprint and the generally rectangular footprint includes first and second long sides and first and second short sides.

5. The apparatus of claim 4, wherein each of the first and second long sides and first and second short sides includes a notch.

6. The apparatus of claim 5, wherein the first and second long sides each include an inward notch and the first and second short sides each include an outward notch.

7. The apparatus of claim 6, wherein the frame is symmetrical about a centerline bisecting the first and second long sides and the frame is symmetrical about a centerline bisecting the first and second short sides.

8. An overspray collector for an ink jet printer, the overspray collector comprising a frame defining a first opening configured to surround a first print area of the ink jet printer, the frame configured to receive overspray from operation of the ink jet printer and to be removable from the ink jet printer, wherein the frame comprises a woven material having a coating with low adhesion with ink.

9. The overspray collector of claim 8, wherein the woven material comprises woven fiberglass.

10. The overspray collector of claim 9, wherein the frame is coated with polytetrafluoroethylene (PTFE).

11. The overspray collector of claim 8, wherein the frame defines a second opening configured to surround a second print area of the ink jet printer.

12. The overspray collector of claim 8, wherein the frame comprises first and second long sides and first and second short sides.

13. The overspray collector of claim 12, wherein the frame is symmetrical about a centerline bisecting the first and second long sides.

14. The overspray collector of claim 12, wherein the frame is symmetrical about a centerline bisecting the first and second short sides.

15. An ink jet printer comprising:

first and second card transport belts, each comprising an exposed belt portion configured for conveying cards and holding cards in a print position; and a removable overspray collector comprising a frame defining a first opening configured to surround the exposed belt portion of the first card transport belt and a second opening configured to surround the exposed belt portion of the second card transport belt, the frame configured to receive overspray from operation of the ink jet printer while at least one card is held by at least one of the exposed belt portions in the corresponding print position, wherein the frame comprises a woven material having a coating with low adhesion with ink.

16. The ink jet printer of claim 15, wherein the frame is configured to receive overspray from operation of the ink jet printer while a first card is held over the first opening by the exposed belt portion of the first card transport belt and while a second card is held over the second opening by the exposed belt portion of the second card transport belt.

17. The overspray collector of claim 15, wherein the woven material is coated with polytetrafluoroethylene (PTFE).

* * * * *